United States Patent [19]

Siniko

[11] Patent Number: 4,726,576

[45] Date of Patent: Feb. 23, 1988

[54] WORK SUPPORTING DEVICE

[76] Inventor: Josip Siniko, Ehrenmalstrasse 87, D-6954 Hassmersheim, Fed. Rep. of Germany

[21] Appl. No.: 927,835

[22] Filed: Nov. 5, 1986

[30] Foreign Application Priority Data

Nov. 26, 1985 [DE] Fed. Rep. of Germany ....... 3541638

[51] Int. Cl.$^4$ .............................................. B23Q 1/04
[52] U.S. Cl. ...................................... 269/71; 269/82; 409/168; 409/224
[58] Field of Search ..................... 409/168, 224; 279/5, 279/112; 269/81-85, 71, 74, 88

[56] References Cited

U.S. PATENT DOCUMENTS

| | | | |
|---|---|---|---|
| 1,414,970 | 5/1922 | Nelson | 409/168 |
| 1,424,597 | 8/1922 | Sloan | 279/112 |
| 2,411,641 | 11/1946 | Sealey | 409/168 |
| 2,528,053 | 10/1950 | Harris | 409/224 |
| 2,538,640 | 1/1951 | Click | 269/82 |
| 3,030,135 | 4/1962 | Polanski | 269/82 |
| 3,249,364 | 5/1966 | Scharfen | 279/5 |

Primary Examiner—Robert C. Watson
Attorney, Agent, or Firm—Peter K. Kontler

[57] ABSTRACT

A work supporting device for secondary treatment of workpieces by hand has a base which is affixed to a bench and defines a vertical pivot axis for a support serving to mount a chuck carrier for rotation about a first horizontal axis. The chuck in the carrier can support a work holder so as to allow for angular movements of the work holder about a second horizontal axis extending at right angles to the first horizontal axis. The support can be clamped to the base and the carrier can be simultaneously clamped to the support by a linkage having a pivot member mounted in the base for rotation about the vertical axis, a lever which is pivotably connected to the upper end portion of the pivot member, and a link which is pivotably connected to the lever and to the carrier so that it can turn about the first horizontal axis. The lever can be pivoted by a rotary eccentric through the medium of a knob. The carrier has a convex surface which abuts a concave surface of the support, and the support has a flat underside abutting a flat top face of the base.

20 Claims, 13 Drawing Figures

WORK SUPPORTING DEVICE

BACKGROUND OF THE INVENTION

The present invention relates to improvements in work supporting devices in general, and more particularly to improvements in devices which render it possible to change the orientation of a workpiece by rotating or pivoting the workpiece about a plurality of mutually inclined axes. Work supporting devices of the type to which the present invention pertains can be used in private workshops as well as in smaller, medium-sized or large manufacturing, assembling or repair plants of all kinds.

It is already known to mount the base of a work supporting device on a bench or on a like support, to mount on the base a chuck carrier in such a way that the latter can pivot about two mutually inclined axes, to mount the chuck on or in the carrier, and to provide means for locking the chuck in a selected position so as to allow for proper treatment of (e.g., removal of material from) a workpiece which is held in the chuck, either directly or by means of a suitable work holder. By way of example, work supporting devices of the just outlined character can be used for treatment (including polishing) of electrodes or other types of workpieces which require secondary treatment, e.g., by hand. Such secondary treatment is unavoidable in connection with a wide variety of mass-produced (e.g., machined) workpieces because a secondary treatment in automatic or semiautomatic machines is too expensive or not possible. Some of the treatments to which numerous mass-produced workpieces must be subjected include polishing, truing, removal of burrs or other sharp projections, ultrasonic treatment and many others. Some of these secondary treatments must be carried out while the workpiece which is held in the chuck of the work supporting device is observed by way of a magnifying glass, a microscope or other suitable optical enlarging means. A prerequisite for adequate manual treatment is proper mounting of the workpiece in a supporting device and reliable retention of the workpiece in a selected position so that the workpiece is held in an optimum orientation and/or at an optimum level for observation and manual treatment.

In accordance with a presently known proposal, the connection between the chuck carrier and the base of a work supporting device comprises a universal (spherical) joint and means for releasably locking the joint. If the locking means is actuated to release the joint, the latter allows for movements of the chuck and of the workpiece in the chuck to any one of a practically infinite number of different positions. A drawback of the just discussed work supporting device is that the universal joint does not allow for rapid and highly accurate selection of the desired position (level and/or orientation) of the workpieces, such as the aforediscussed electrodes. One of the reasons is that the operator cannot readily avoid simultaneous angular displacements of the chuck carrier about more than a single axis, e.g., only about a vertical axis or only about a horizontal axis. In other words, a universal joint is not suited to allow for rapid and/or accurate selective angular displacement of the clamped workpiece about a single axis or for selective angular displacement of the workpiece about several axes in a predetermined sequence.

OBJECTS AND SUMMARY OF THE INVENTION

An object of the invention is to provide a novel and improved work supporting device which renders it possible to hold and adjust the position and/or orientation of a selected workpiece with a high degree of accuracy, in a simple and time-saving manner, and in any desired sequence.

Another object of the invention is to provide a simple, compact and inexpensive work supporting device which can accept and properly hold a wide variety of workpieces and/or work holders and which can be manipulated properly with a minimum of training.

A further object of the invention is to provide a novel and improved chuck carrier for use in the above outlined work supporting device.

An additional object of the invention is to provide a work supporting device which can be readily transported and transferred between different locales of use and wherein a single manipulation suffices to allow for requisite adjustment of the chuck and of the workpiece therein about one or more selected axes.

Still another object of the invention is to provide a work supporting device which, though especially suited for secondary treatment of certain types of electrodes, can be used with equal or similar advantage for secondary or primary treatment of a variety of other workpieces.

Another object of the invention is to provide a novel and improved method of releasably supporting a workpiece for adjustment about a plurality of mutually inclined and/or parallel axes.

The invention is embodied in a work supporting or holding device which comprises a base (e.g., a plate-like member which can be bolted or otherwise fixedly secured to a bench in a workshop or the like), a support member which is mounted in and is rotatable relative to the base about a first axis (e.g., about a substantially vertical axis), and a carrier member (particularly for a chuck) which is mounted in and is rotatable relative to the support member about a second axis which is inclined relative to the first axis (the second axis is or can be horizontal and can cross the first axis in space). One of the two members has a concave surface and the other of these members has a convex surface which is complementary to and adjacent the concave surface, and the centers of curvature of the two surfaces are located on or close to the second axis. The improved work supporting device further comprises means for releasably clamping the support member to the base and for preferably simultaneously releasably clamping the concave and convex surfaces to each other to thus prevent rotation of the two members relative to each other as well as relative to the base, and means for actuating the clamping means so as to allow for locking of the two members in selected positions or for unlocking of such members preparatory to an adjustment of the carrier member relative to the support member about the second axis and/or an adjustment of the support member relative to the base about the first axis. The convex surface can constitute a portion of a substantially cylindrical surface and can be provided on the carrier member. The clamping means can comprise a linkage which couples the support member to the base and to the carrier member.

In accordance with a presently preferred embodiment of the invention, the clamping means comprises a pivot member which is mounted in the base for rotation about the first axis, means (e.g., a nut) for holding the pivot member against movement relative to the base in the direction of the first axis, a lever which is connected to the pivot member for pivotal movement about a third axis which is parallel to the second axis, and a link which has a first portion connected to the lever for pivotal movement about a fourth axis parallel to the third axis and a second portion connected to and rotatable with the carrier member about the second axis. The actuating means of such work supporting device can comprise means for pivoting the lever about the third axis, and such pivoting means can comprise a rotary eccentric which is tracked by a follower of the lever. The eccentric can be rotatably mounted in the support member and the actuating means can further comprise manually operable means (e.g., a rotary knob) for rotating the eccentric. Means can be provided for permanently biasing the eccentric to a selected angular position in which the clamping means is operative or idle. The fourth axis is preferably disposed between the eccentric and the third axis.

In accordance with a presently preferred embodiment of the invention, the carrier member has a plane external surface which is parallel to the second axis, and the work supporting device further comprises a chuck which is mounted or incorporated in the carrier member for rotation about the second axis in the region of the plane surface of the carrier member. The carrier member or the chuck is preferably provided with a substantially circular opening whose axis intersects the second axis, and the chuck comprises a plurality of jaws (e.g., two jaws which are disposed diametrically opposite each other with reference to the axis of the opening) which are movable relative to the opening substantially radially of the axis of the opening, and means for moving the jaws relative to the carrier member. Each jaw can be provided with an arcuate projection which faces the axis of the opening and whose center or curvature is located on the axis of the opening. A centering portion (e.g., a cylindrical stud) of a work holder can be received in the opening of the carrier member to be engaged by the jaws in order to hold the work holder in a predetermined position relative to the carrier member. The centering portion can be provided with a circumferential groove for the projections of the jaws. Alternatively, the work holder can comprise an elongated shaft-like element which has a circumferential groove for reception of the aforementioned projections of the jaws when a stud of the shaft-like element is received in the opening of the carrier member and the jaws are moved radially of the axis of the opening toward and into engagement with the stud of the shaft-like element.

The carrier member can be provided with a slot for the aforementioned link of the clamping means, and such link is received in the slot with a certain clearance which can be sealed or substantially sealed by a suitable shroud which is movably mounted in the carrier member.

The axis of the eccentric which forms part of the actuating means can extend at right angles to the first and second axes. In order to ensure adequate clamping of the support member to the base, the base is preferably provided with a first face (e.g., a top face of the base) and the support member is provided with a second face (which can constitute the underside of the support member), and the second face is biased against the first face in response to operation of the actuating means (e.g., by way of the aforementioned rotary knob) in a direction to clamp the concave and convex surfaces against each other and to simultaneously urge the face of the support member against the face of the base.

The base can be provided with holes for reception of bolts or other suitable means which secure the base to a bench or the like.

In order to ensure that the chuck (which is mounted in or incorporated into the carrier member) and the actuating means are readily accessible to the operator, the actuating means and the carrier member are preferably disposed at opposite sides of the first axis.

The novel features which are considered as characteristic of the invention are set forth in particular in the appended claims. The improved work supporting device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Referring first to FIGS. 1 to 3 and 5 to 8, there is shown a work supporting device which comprises a solid square or rectangular plate-like base 1 having a set of holes or bores 2 for bolts (not shown) or analogous means for detachably securing the base to a bench (not shown) or the like, e.g., in a workshop which is set up in a private home or in a plant. The base 1 is formed with a substantially centrally located vertical bore for an upright pivot member 4 which is rotatable therein about a vertical axis 3 and is held against axial movement (in the direction of the arrow 6) by a nut 5 received in a recess which is machined into the underside of the base. The nut 5 mates with the externally threaded lower end portion of the pivot member 4 and is compelled to share all angular movements of the latter.

Figure 1:
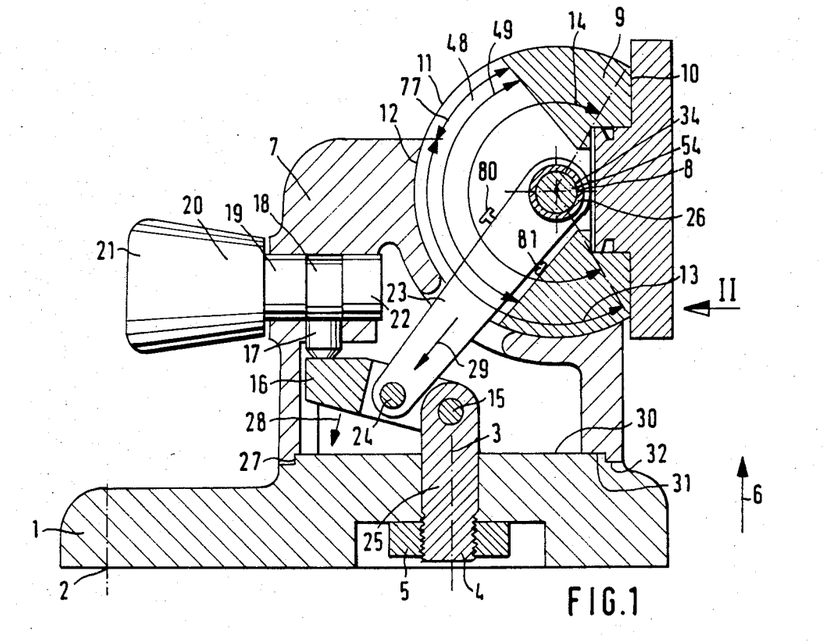
FIG. 1 is a vertical sectional view of a work holding device which embodies one form of the invention.
Figure 2:
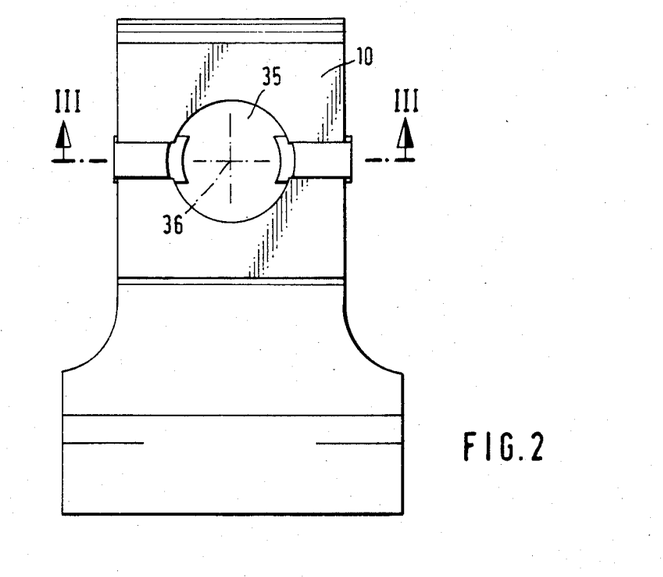
FIG. 2 is an end elevational view as seen in the direction of arrow II in FIG. 1.
Figure 3:
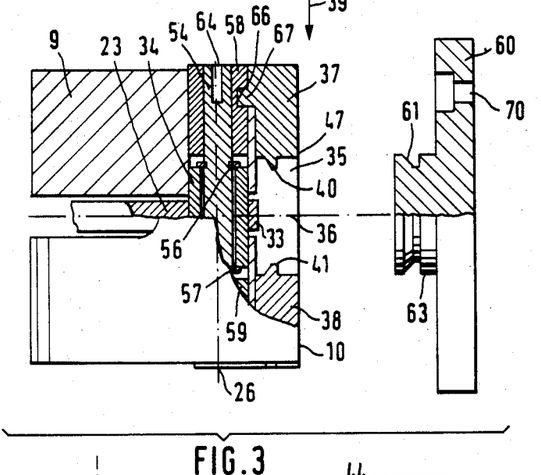
FIG. 3 is a horizontal sectional view as seen in the direction of arrows from the line III—III in FIG. 2, with the work holder detached from the carrier member.

The improved work supporting device further comprises a solid block-shaped support member 7 which is rotatable with the pivot member 4 about the vertical axis 3 and has at its underside an annular face 32 adjacent to a top face 30 of the base 1. The top face 30 is provided on an annular platform 31 of the base 1. The support member 7 has a concave surface 12 which is adjacent a complementary convex surface 11 of a carrier member 9 which is pivotable relative to the support member 7 about a horizontal axis 8 crossing the vertical axis 3 in space, i.e., the axes 3 and 8 are disposed in different planes). The illustrated carrier member 9 is a truncated cylinder whose peripheral surface includes the aforementioned convex surface 11 as well as a plane surface 10 disposed in a chordal plane of the cylinder. The plane surface 10 is parallel to the axis 8. It will be seen that the support member 7 can turn (with the carrier member 9) relative to the base 1 about the axis 3, and that the carrier member 9 can turn (relative to the support member 7 and base 1) about the axis 8 so that a workpiece which is supported by the carrier member 9 can change its orientation in a number of different ways.

The means for releasably clamping the support member 7 to the carrier member 9 as well as to the base 1 includes the aforementioned pivot member 4 and a lever 16 one end portion of which is pivotable relative to the pivot member 4 about a horizontal axis (note the shaft 15) which is parallel to the axis 8, and whose other end portion carries a follower 17 for an eccentric 18 forming part of the means for pivoting the lever 16 about the axis of the shaft 15. An intermediate portion of the lever 16 carries a shaft 24 whose axis is parallel to the axis 8 and which is articulately connected with one end portion of a link 23 constituting a further element of the clamping means. The other end portion of the link 23 has an eyelet 33 (see particularly FIGS. 5 and 6) which is articulately connected to the carrier member 9 for angular movement about the axis 8. As can be readily seen in FIG. 1, the eccentric 18 can pivot the lever 16 in a counterclockwise direction (about the axis of the shaft 15) whereby the lever 16 pulls the link 23 in the direction of an arrow 29 to thereby urge the convex surface 11 against the concave surface 12, i.e., to lock the carrier member 9 to the support member 7. At the same time, the lever 16 tends to pivot about the axis of the shaft 24 (which is disposed between the shaft 15 and the follower 17) to urge the face 32 at the underside of the support member 7 into pronounced frictional engagement with the top face 30 of the annular platform 31 of the base 1, i.e., to simultaneously lock the support member 7 to the base.

The eccentric 18 is rotatable with a horizontal shaft 19 which is rotatable in the support member 7 and whose axis extends at right angles to the axes 3 and 8. The actuating means for the clamping means 4, 16, 23 further comprises a handle or handgrip member 20 whose knob 21 can be rotated by hand to move the eccentric 18 relative to the follower 17 and to thereby pivot the lever 16 clockwise or to allow some pivotal movement of the lever 16 in a counterclockwise direction (as seen in FIG. 1). The handle 20 and the carrier member 9 are disposed at opposite sides of the axis 3 so that the plane surface 10 of the carrier member 9 and the knob 21 of the handle 20 are readily accessible to the operator of the improved work supporting device. The latter further comprises a nut, a diametrically extending pin or any other suitable means (indicated at 22) for holding the shaft 19 for the eccentric 18 and knob 21 against axial movement relative to the support member 7.

When the follower 17 of the lever 16 tracks a portion of the eccentric 18 which is rather close to the axis of the shaft 19, the lever 16 is not biased in a counterclockwise direction so that the carrier member 9 can be turned relative to the support member 7 (about the axis 8) and the support member 7 can be rotated relative to the base 1 (about the axis 3). The pivot member 4 is rotatable in a first bearing 25 (e.g., a friction bearing or a thrust bearing in the base 1) and the end portion 33 of the link 23 is rotatable about a second bearing 26 whose axis coincides with the axis 8.

If the knob 21 is rotated to change the angular position of the shaft 19 so that the follower 17 is engaged by a portion of the eccentric 18 which is located at a greater distance from the axis of the shaft 19, the lever 16 is pivoted in a counterclockwise direction and causes the surfaces 11, 12 to bear against each other as well as the faces 30, 32 to move into pronounced frictional engagement with one another, i.e., the carrier member 9 (and a workpiece thereon) is locked in a selected position relative to the axes 3 and 8. The direction in which the lever 16 can be pivoted by the eccentric 18 to lock the carrier member 9 in a selected position is indicated by the arrow 28; the link 23 is then pulled in the direction of arrow 29. The nut 5 resists any and all upward axial movements of the pivot member 4 so that the lever 16 must turn about the axis of the shaft 15 in order to pull the link 23 in the direction of the arrow 29. The actuating means 18–22 preferably embodies a self-locking feature so that the carrier member 9 is reliably held in a selected position until and unless the operator decides to turn the knob 21 (e.g., with reference to a scale, not shown) in a direction to reduce the bias upon the follower 17 and to thus allow the lever 16 and the link 23 to relax the pressure between the surfaces 11, 12 as well as between the faces 30, 32 to an extent which is necessary to enable the operator to rotate the support member 7 about the axis 3 and/or to rotate the carrier member 9 about the axis 8.

The end portion 33 of the link 23 surrounds a portion of a hollow cylindrical shaft 34 which is mounted in the carrier member 9 in such a way that its axis coincides with the axis 8. The end portions of the shaft 34 can be fixedly mounted in the support member 7 (which is preferably bifurcated) and the carrier member 9 is then rotatable about the median portion of the shaft 34.

The carrier member 9 has a circumferentially extending arcuate slot 48 for the upper portion of the link 23. The slot 48 extends along an arc 49 of 120°. This angle can be reduced (e.g., to 70°) or increased (e.g., to 160°) without departing from the spirit of the invention. The surfaces at the ends of the slot 48 (as seen in the circumferential direction of the carrier member 9) determine the extent of pivotability of the carrier member about the axis 8, i.e., relative to the support member 7.

The surfaces 11, 12 of the members 7 and 9 contact each other along an angle 13 of 100° (as measured circumferentially along the convex surface 11 of the carrier member 9). The angle 13 can be increased (e.g., to 120°) or reduced (e.g., to 70°). The full length of the convex surface 11 (note the angle 14) exceeds the angle 13 and can be between 180° and 270° e.g., in the range of 225°.

The plane surface 10 of the carrier member 9 has a circular opening or socket 35 whose center is located on an axis 36 extending at right angles to and intersecting the axis 8, i.e., the axis 36 is or can be parallel to the axis of the shaft 19 for the eccentric 18.

The carrier member 9 supports or embodies a chuck 47 having two jaws 37, 38 (see particularly FIG. 3) which are disposed diametrically opposite each other with reference to the axis 36 and are movable radially of the axis (note the double-headed arrow 39), i.e., deeper into or away from the center of the opening 35 in the plane surface 10. The confronting surfaces of the jaws 37, 38 have arcuate projections 40, 41 in the form of ribs whose centers of curvature are located on the axis 36. The means for moving the jaws 37, 38 in directions which are indicated by the double-headed arrow 39 comprises a shaft 54 which is rotatably mounted in the hollow shaft 34 and is held against axial movement in the shaft 34 by two split rings 56 and 57. The upper end portion of the shaft 54 has a socket 64 for reception of a suitable tool (e.g., a wrench, not shown) which is used to rotate the shaft 54 clockwise or counterclockwise to thereby move the jaws 37, 38 nearer to or further away from each other. To this end, the end portions of the shaft 54 are provided with external threads which are inclined in opposite directions and mate with nuts 58, 59 which are coupled with the jaws 37, 38, respectively. The nuts 58, 59 are held against rotation and are provided with sockets 66 for complementary protuberances 67 on the respective jaws. The just described construction ensures that the jaws 37, 38 are compelled to move axially of the shaft 34 toward or away from each other in response to rotation of the shaft 54 in a clockwise or counterclockwise direction.

Figure 6:
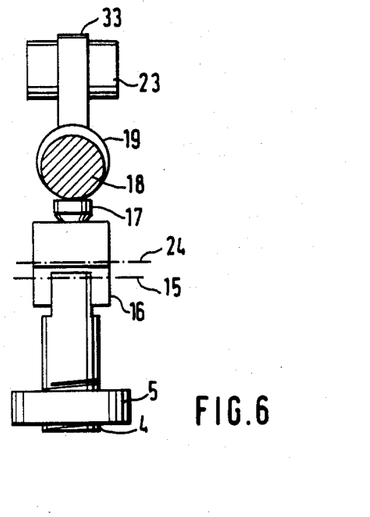
FIG. 6 is an end elevational view as seen in the direction of arrow VI in FIG. 5, with the eccentric shown in a vertical sectional view.

FIGS. 1 and 6 show a plate-like work holder 60 which has a circular, oval, square, rectangular or other polygonal outline and has one or more tapped bores or holes 70 for externally threaded fasteners which connect the holder 70 with a workpiece (e.g., an electrode or the like, not shown). The holder 60 can be connected directly with a workpiece or with a second holder in which the workpiece is mounted. The left-hand side of the holder 60, as viewed in FIGS. 1 or 6, has a cylindrical centering portion in the form of a stub 69 which can be fitted snugly in the opening 35 of the carrier member 9 and can be locked to the carrier member by the chuck 47. To this end, the stub 69 has a circumferential groove 61 for the arcuate projections 40, 41 of the jaws 37, 38. By causing the projections 40, 41 to enter the groove 61 but initially with a minimal amount of axial and/or radial play so as to allow the holder 60 to rotate relative to the carrier member 9, the operator can change the angular position of the workpiece by turning it about the axis 36, i.e., the angular position of the workpiece on the holder 60 can be changed about the axis 36, 8 and/or 3.

Figure 4:
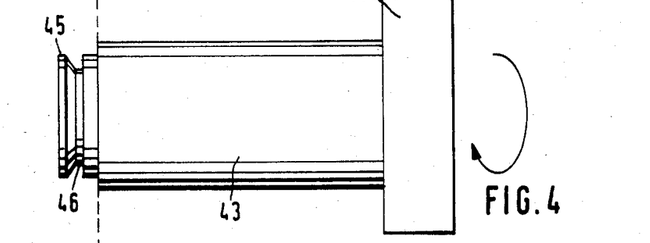
FIG. 4 is a side elevational view of a modified work holder which can be used in the device of FIGS. 1 to 3.
Figure 5:
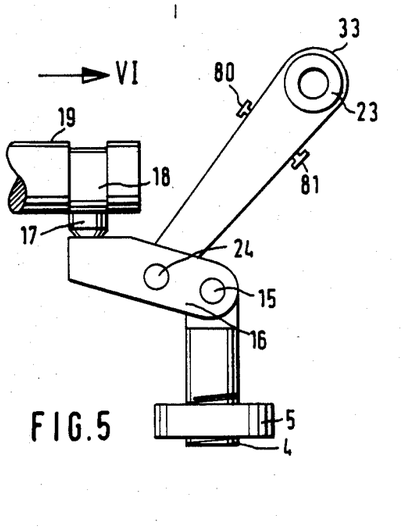
FIG. 5 is an elevational view of the clamping mechanism and of a portion of the actuating means therefor.

FIG. 4 shows a modified work holder which includes an elongated shaft 43 replacing the plate-like holder 60 and having a smaller-diameter centering portion 45 constituting a stub which can be fitted snugly into the opening 35 of the carrier member 9 to be held therein by the projections 40, 41 of the jaws 37, 38 after the shaft 54 is rotated by a tool to move the arcuate projections 40, 41 of the jaws into the peripheral groove 46 of the stub 45. FIG. 4 further shows an electrode 44 which is detachably secured to the other end portion of the shaft (work holder 43) to undergo one or more treatments after the stub 45 is properly secured to the carrier member 9 and the clamping means 4, 16, 23 is actuated by the eccentric 18 to hold the electrode 44 in a predetermined orientation.

Figure 7:
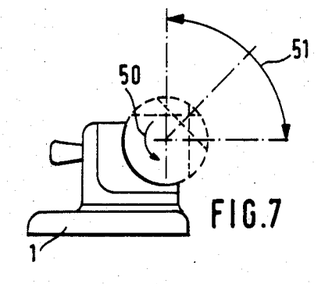
FIG. 7 is a smaller-scale elevational view of the device, showing the manner in which the carrier member can turn relative to the support member.
Figure 8:
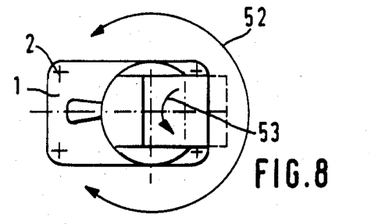
FIG. 8 is a smaller-scale plan view of the device, showing the manner in which the support member can be pivoted relative to the base.
Figure 9:
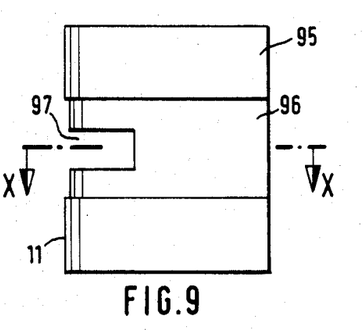
FIG. 9 is a plan view of a modified carrier member which is provided with a mobile shroud.
Figure 10:
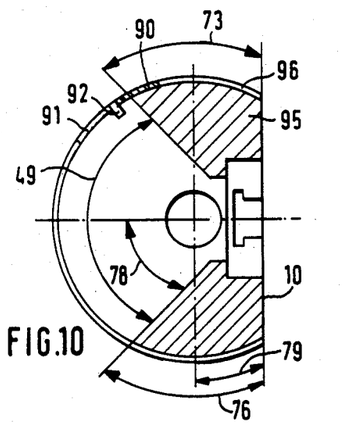
FIG. 10 is a sectional view as seen in the direction of arrows from the line X—X of FIG. 9.
Figure 11:
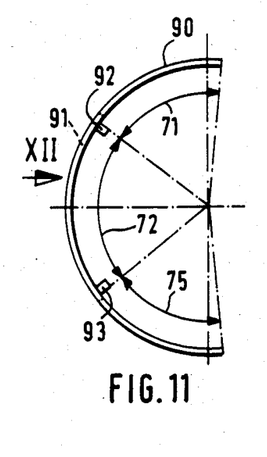
FIG. 11 is a side elevational view of the shroud for the carrier member of FIGS. 9 and 10.
Figure 12:
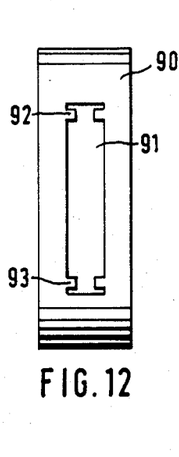
FIG. 12 is a front elevational view of the shroud as seen in the direction of arrow XII in FIG. 11.

FIG. 7 shows the improved work supporting device on a smaller scale. The arrows 50 and 51 indicate the directions in which the carrier member 9 can be rotated relative to the support member 7 in response to a reduction of frictional engagement between the surfaces 11 and 12. FIG. 8 shows the directions (arrows 52 and 53) in which the support member 7 can be rotated relative to the base 1 in response to a requisite relaxation of frictional engagement between the faces 30 and 32 of the base 1 and support member 7, respectively.

The work supporting device of the present invention can be further provided with means for facilitating movements of the workpiece in the chuck 47 to one or more predetermined positions, e.g., to the positions in which the flat surface 10 of the carrier member 9 is located in a horizontal or in a vertical plane. FIG. 1 shows a first stop 80 which is provided on an intermediate portion of the link 23 to abut the surface at the upper end of the slot 48 when the surface 10 is located in a horizontal plane, and a second stop 81 which is also provided on the link 23 and abuts the surface at the bottom of the slot 48 when the surface 10 is located in a vertical plane (as actually shown in FIG. 1). Each of the stops 80, 81 can constitute a screw or an analogous externally threaded member which is received in a tapped bore of the link 23 so as to allow for adjustments (if necessary) of inclination of the surface 10 in the one or the other end position of the link 23.

FIGS. 9 to 12 illustrate a somewhat modified carrier member 95 which has a slot 97 corresponding to the slot 48 of the carrier member 9 and a peripheral groove 96 which extends circumferentially beyond the ends of the slot 97 and is wider than the slot. The groove 96 receives an arcuate shroud or baffle 90 (see particularly FIGS. 11 and 12) which has an elongated slot 91 in register with the slot 97 of the carrier member 95. The purpose of the shroud 90 is to reduce the likelihood of injury to an operator as well as to reduce the likelihood of contamination of parts (such as shafts 34, 35 and chuck 47) in the interior of the carrier member 95. The shroud 90 can constitute a rigid piece of sheet metal which is slidably received in the groove 96 so that it can move relative to the slot 97 in the circumferential direction of the carrier member, i.e., about the axis 8 of the work supporting device which embodies the structure of FIGS. 9 to 12. The groove 96 can extend all the way to the ends of the convex surface 11 of the carrier member 95. The width of the slot 91 can match that of the slot 97 but the slot 91 is or can be shorter than the slot 97 (as seen in the circumferential direction of the carrier member 95). The length of the slot 91 is shown at 72, the length of the shroud 90 beyond one end of the slot 91 is indicated by the arrow 71, and the length of the shroud beyond the other end of the slot 91 is indicated by the arrow 75. The ends of the slot 91 are flanked by two radially inwardly extending stops 92 and 93 (such stops can constitute radially inwardly bent portions of the shroud 90) which are received in the slot 97 of the carrier member 95. When the carrier member 95 is rotated relative to the support member 7 (not shown in FIGS. 9–12), it strikes against the stop 92 or 93 (depending upon the direction of rotation of the carrier member) and entrains the shroud 90 so that the shroud overlies a portion of the slot 97 and reduces the likelihood of penetration of moisture, solid contaminants and/or injury to a careless operator.

The angle which is indicated by the arrow 72 (length of the slot 91 in the shroud 90) is preferably smaller than the angle 49 or 74. The angle which is indicated by the arrow 71 is preferably smaller than or at most equals the angle 73 (denoting the angular distance between the upper end of the slot 97 and the plane surface 10 of the carrier member 95). The angle which is denoted by the arrow 75 is smaller than or at most matches the angle which is denoted by the arrow 76 (the distance between the lower end of the slot 97 and the plane surface 10 of the carrier member 95). The angle which is indicated by the arrow 77 (FIG. 1) is smaller than or at most matches the angle which is indicated by the arrow 71. The difference between the angles 78 and 79 is smaller than or at most equals the angle which is indicated by the arrow 75. The sum of the angles which are indicated by the arrows 71, 72 and 75 is smaller than the angle which is indicated by the arrow 14 (FIG. 1). The above angles are given by way of example and apply only for a presently preferred embodiment of the carrier member 95 and its shroud 90.

Figure 13:
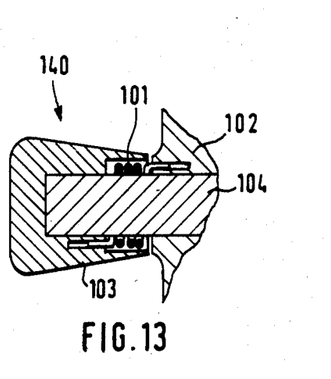
FIG. 13 is a fragmentary axial sectional view of modified actuating means having means for resetting the eccentric to a predetermined angular position.

FIG. 13 shows a modified actuating means 140 for the clamping means including the pivot member 4, lever 16 and link 23 of FIG. 1. The actuating means comprises a knob 103 which can be rotated against the opposition of or under the action of a torsion spring 101. The shaft 104 for the knob 103 (such shaft carries the eccentric, not shown) is rotatably journalled in the support member 102 and is surrounded by the convolutions of the torsion spring 101. One end portion of this spring is anchored in the support member 102 and the other end portion of the spring is anchored in the knob 103 so that the spring tends to maintain the knob, the shaft 104 (and hence the eccentric on the shaft 104) in a predetermined angular position. The arrangement is preferably such that the torsion spring 101 tends to rotate the knob 103 in a direction to actuate the clamping means, i.e., to bias the link 23 of FIG. 1 in the direction of the arrow 29. Thus, the operator must rotate the knob 103 against the opposition of the spring 101 in order to relax the friction between the faces 20, 32 as well as between the surfaces 11, 12, i.e., to turn the carrier member 9 or 95 relative to the support member 7 or 102, and/or to turn the support member 7 or 102 relative to the base 1.

The surfaces 11 and 12 are preferably large so as to ensure that the carrier member 9 can be held against angular movement about the axis 8 in response to the application of a relatively small force by way of the clamping means 4, 16 and 23. The same applies for the areas of the faces 30 and 32.

The improved work supporting device exhibits the important advantage that it allows for selective angular displacement of the work holder 43 or 60 about the axis 36, for selective angular displacement of the carrier member 9 or 95 about the axis 8 and/or for selective angular displacement of the support member 7 or 102 about the axis 3. This renders it possible to select the orientation and level of the workpiece 44 (or another workpiece) with a much higher degree of accuracy and more conveniently than in a work supporting device wherein the workpiece is held on the base by means of a spherical joint. Thus, the angular position of the lever 16 can be readily selected in such a way that the faces 30, 32 offer a certain amount of resistance to rotation of the support member 7 or 102 about the axis 3 (this reduces the likelihood of accidental rotation of the support member (e.g., in response to rotation of the carrier member about the axis 8), and that the surfaces 11, 12 offer a certain resistance to rotation of the carrier member 9 or 95 about the axis 8 (e.g., accidentally during rotation of the support member 7 or 102 about the axis 3).

While it is possible to employ a clamping means which includes two discrete portions, one for locking the support member to the base and the other for locking the carrier member to the support member), the illustrated clamping means is preferred at this time because the workpiece can be locked in a selected position or released for removal from the supporting device or for a change of its orientation with little loss in time.

It is further possible to select the mounting of the carrier member 9 or 95 in such a way that the axis 8 is not normal to the axis 3. However, a device wherein the axis 8 is normal to the axis 3 is often desirable and advantageous because such construction allows for angular movements of the carrier member (about the axis 8) through a very large angle (as compared with the angular movability of the carrier member in a work supporting device whose dimensions are otherwise the same as those of the device wherein the axes 3 and 8 make an angle of 90°).

The actuating means which employs an eccentric exhibits the advantage that the lever 16 can be pivoted in response to the application of a relatively small force but the clamping means is capable of holding the support member against any and all movements relative to the carrier member and base for any desired interval of time. Moreover, and as mentioned above, the illustrated actuating means can be designed to exhibit a self-locking feature so as to even further reduce the likelihood of accidental (unintentional) relaxation of the force with which the lever 16 and the link 23 hold the support member against movement relative to the base and carrier member. Furthermore, the knob 21 or 103 enables the operator to select the clamping force with a high degree of precision and reproducibility. This is desirable and advantageous in connection with secondary treatment of a number of workpieces.

The provision of the opening 35 in the carrier member 9 or 95 ensures that a work holder can be inserted as often as desired and that the inserted work holder can be held with a selected force. At the same time, the chuck 47 renders it possible to turn the work holder about the axis 36 to further enhance the versatility of the improved work supporting device. The selection of an appropriate work holder (e.g., a plate-like holder 60 which is immediately adjacent the surface 10 of the carrier member 9 or 95 or a shaft-like holder 43 which can maintain the workpiece (such as 44) at a desired optimum distance from the chuck 47) will depend on the nature (e.g., configuration and/or bulk) of workpieces and/or upon the nature of treatment to which the workpieces must be subjected. If a workpiece is rather heavy and/or is to be subjected to a treatment which necessitates the application of a pronounced force, the operator may wish to select the short work holder 60 which can abut directly against the preferably large plane surface 10 of the carrier member 9 or 95 so as to reduce the likelihood of any stray movements of the workpiece during treatment.

The dimensions of the opening 35 and jaws 37, 38 can be readily selected in such a way that the opening can receive the centering projection 45 or 69 of a standard work holder, e.g., a work holder which is specifically designed to accept certain types of electrodes or analogous workpieces. The provision of projections 40, 41 on the jaws 37 and 38 (in conjunction with the circumferential groove 46 or 61 of a centering portion 45 or 69) is desirable and advantageous because this allows for reliable retention of the work holder in a selected position as well as for rapid loosening of the chuck 47, either to allow for changes in the angular position of the work holder relative to the carrier member or to allow for extraction of the work holder from the opening 35.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A work supporting device comprising a base; a support member mounted in and rotatable relative to said base about a first axis; a carrier member mounted in and rotatable relative to said support member about a second axis which is inclined relative to said first axis, one of said members having a concave surface and the other of said members having a convex surface complementary to and adjacent said concave surface, said surfaces having centers of curvature on or close to said second axis; means for releasably clamping said support member to said base and for releasably clamping said surfaces to each other to thus prevent rotation of said members relative to each other and relative to said base, comprising a pivot member mounted in said base for rotation about said first axis, means for holding said pivot member against movement relative to said base in the direction of said first axis, a lever connected to said pivot member for pivotal movement avout a third axis which is parallel to said second axis, and a link having a first portion connected to said lever for pivotal movement about a fourth axis which is parallel to said third axis and a second portion connected to and rotatable with carrier member about said second axis; and means for actuating said clampin means comprising means for pivoting said lever about said third axis.

2. The device of claim 1, wherein said convex surface constitutes a portion at least of a cylindrical surface and is provided on said carrier member.

3. The device of claim 1, wherein said first axis is disposed at right angles to said second axis.

4. The device of claim 1, wherein said pivoting means comprises a rotary eccentric and said lever has a follower tracking said eccentric.

5. The device of claim 4, wherein said fourth axis is disposed between said third axis and said eccentric.

6. The device of claim 4, wherein said eccentric is rotatably mounted in said support member and said actuating means further comprises manually operable means for rotating said eccentric.

7. The device of claim 1, wherein said carrier member has a plane external surface which is parallel to said second axis and further comprising a chuck mounted in said carrier member in the region of said plane surface.

8. The device of claim 7, wherein said chuck has a substantially circular opening having a fifth axis extending at right angles to said second axis, said chuck comprising a plurality of jaws movable relative to said opening substantially radially of said fifth axis and means for moving said jaws.

9. The device of claim 8, wherein each of said jaws has an arcuate projection facing said fifth axis and having a center of curvature on said fifth axis.

10. The device of claim 1, wherein said carrier member has a circular opening with a fifth axis extending at right angles to said second axis and further comprising a chuck mounted in said carrier member and having jaws movable relative to said opening substantially radially of said fifth axis, and a work holder having a centering portion receivable in said opening and engageable by said jaws.

11. The device of claim 10, wherein said centering portion has a circumferential groove and said jaws have portions receivable in and extractible from said groove.

12. The device of claim 1, wherein said carrier member has a circular opening having a fifth axis extending at right angles to said second axis and further comprising a chuck mounted in said carrier member and having jaws movable relative to said opening substantially radially of said fifth axis, and a work holder including a shaft receivable in said opening and engageable by said jaws.

13. The device of claim 12, wherein said shaft has a circumferential groove and said jaws have projections receivable in said groove.

14. The device of claim 1, wherein said base has a top face and said support member has a bottom face adjacent said top face, said clamping means including means for biasing one of said faces against the other of said faces.

15. The device of claim 1, further comprising means for securing said base to a work bench or the like.

16. The device of claim 1, wherein said actuating means and said carrier member are disposed a opposite sides of said first axis.

17. A work supporting device comprising a base; a support member mounted in and rotatable relative to said base about a first axis, a carrier member having a slot and mounted in and rotatable relative to said support member about a second axis which is inclined relative to said first axis, one of said members having a concave surface and the other of said members having a convex surface complementary to and adjacent said concave surface, said surfaces having centers of curvature on or close to said second axis; means for releasably clamping said support member to said base and for releasably clamping said surfaces to each other to thus prevent rotation of said members relative to each other and relative to said base, comprising a link rotatable about said second axis and extending from said carrier member by way of said slot, said link being received in said slot with clearance; a shroud movably mounted on said carrier member and overlying said clearance; and means for actuating said clamping means.

18. A work supporting device comprising a base; a support member mounted in and rotatable relative to said base about a substantially vertical first axis; a carrier member mounted in and rotatable relative to said support member about a substantially horizontal second axis which crosses in space with said first axis, one of said members having a concave surface and the other of said members having a convex surface complementary to and adjacent said concave surface, said surfaces having centers of curvature on or close to said second axis; means for releasably clamping said support member to said base and for releasably clamping said surfaces to each other to thus prevent rotation of said members relative to each other and relative to said base; and means for actuating said clamping means including an eccentric and means for rotating said eccentric about a substantially horizontal third axis which extends at right angles to said second axis.

19. The device of claim 18, wherein said clamping means comprises a linkage coupling said support member to said base and to said carrier member.

20. The device of claim 18, wherein said clamping means comprises a pivot member mounted in said base for rotation about said first axis, means for holding said pivot member against movement relative to said base in the direction of said first axis, a lever connected to said pivot member for pivotal movement about a third axis which is parallel to said second axis, and a link having a first portion connected to said lever for pivotal movement about a fourth axis which is parallel to said third axis and a second portion connected to and rotatable with said carrier member about said second axis, said actuating means comprising means for pivoting said lever about said third axis.

* * * * *